Aug. 4, 1959 L. NAMENYI-KATZ 2,898,113

MULTI-TRACK TAPE RECORDERS

Filed March 6, 1956 2 Sheets-Sheet 1

Inventor
L. Namenyi-Katz
By Glascock Downing Seebold
Attys.

Aug. 4, 1959 L. NAMENYI-KATZ 2,898,113

MULTI-TRACK TAPE RECORDERS

Filed March 6, 1956 2 Sheets-Sheet 2

Inventor
L. Namenyi-Katz
By Glascock Downing & Seebold
Attys.

United States Patent Office 2,898,113

Patented Aug. 4, 1959

2,898,113

MULTI-TRACK TAPE RECORDERS

Laszlo Namenyi-Katz, London, England, assignor to Epsylon Research and Development Company Limited, Twickenham, England Application March 6, 1956, Serial No. 569,836

Claims priority, application Great Britain March 9, 1955

1 Claim. (Cl. 274—4)

This invention relates to multi-track tape recorders.

The invention consists of a supporting arrangement for a multi-track tape recorder, recording and/or reproducing head in which the head is adapted to be operated from one track recording position to another in relation to a multi-track recording tape and to be restored to its original position.

Conveniently, the head is adapted to be stepped in succession from a first position to a series of positions corresponding to a series of tracks on the tape and then after it has reached an end position to be restored to the first position.

By this means it is possible to perform a number of different operations.

Thus it is possible by stepping the head to a position corresponding to a particular track on a tape to record or abstract from this track only.

Also a continuous recording may be made on a length of tape extending over a number of tracks on the length.

Thus, for example, conducting strips can be attached to the tape at the ends of a particular length. Then when the tape is run through and comes to the conducting strip this can be made to close a pair of contacts to operate a solenoid or solenoids and the solenoid or solenoids can bring about both the stepping-on of the head to the next track position and also the reversing of the direction of operation of the drive to the tape.

It will be appreciated that a recorder capable of instantaneous reversal is required for this and one form of such a recorder is described in British co-pending patent application No. 6,940 of 1955, which has matured into Patent No. 787,405.

The invention will be further described with reference to an embodiment of a recording head shown in the accompanying drawings.

Figure 3 is a section on the line III—III of Figure 1;

Figure 1:
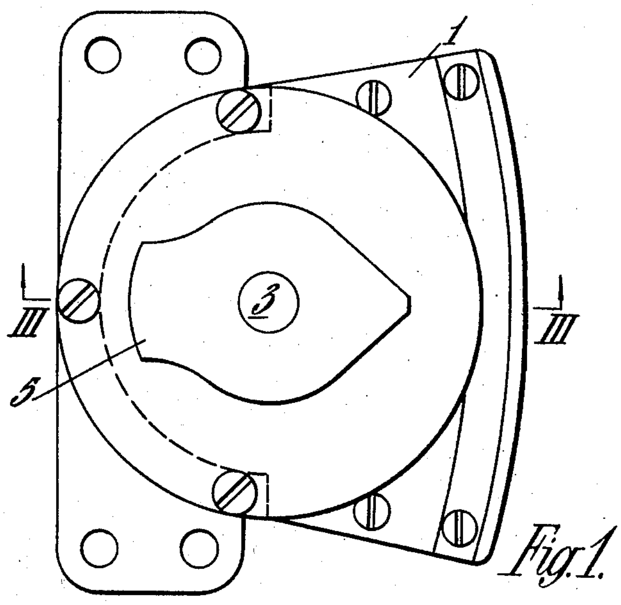
Figure 1 is a plan view.
Figure 2:
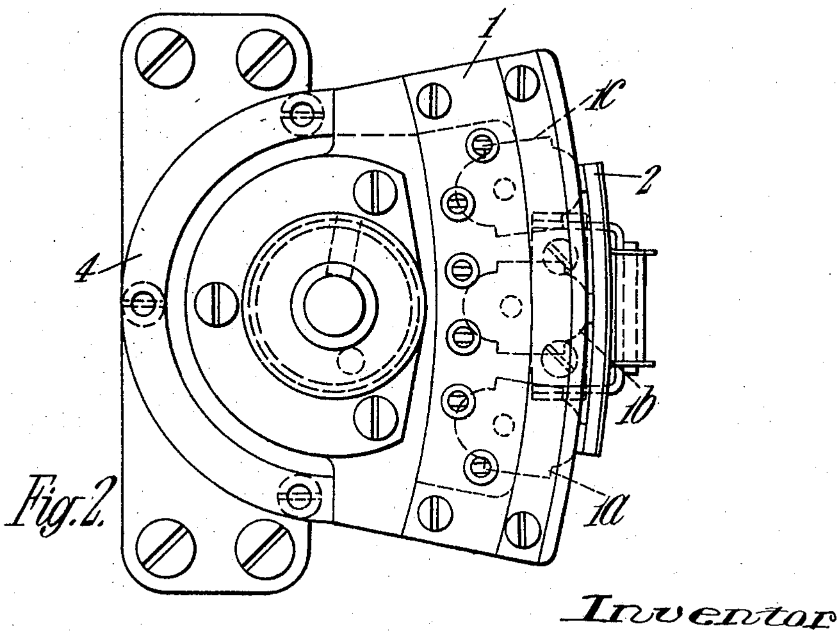
Figure 2 is a plan view with the top cover and knob removed.
Figure 4:
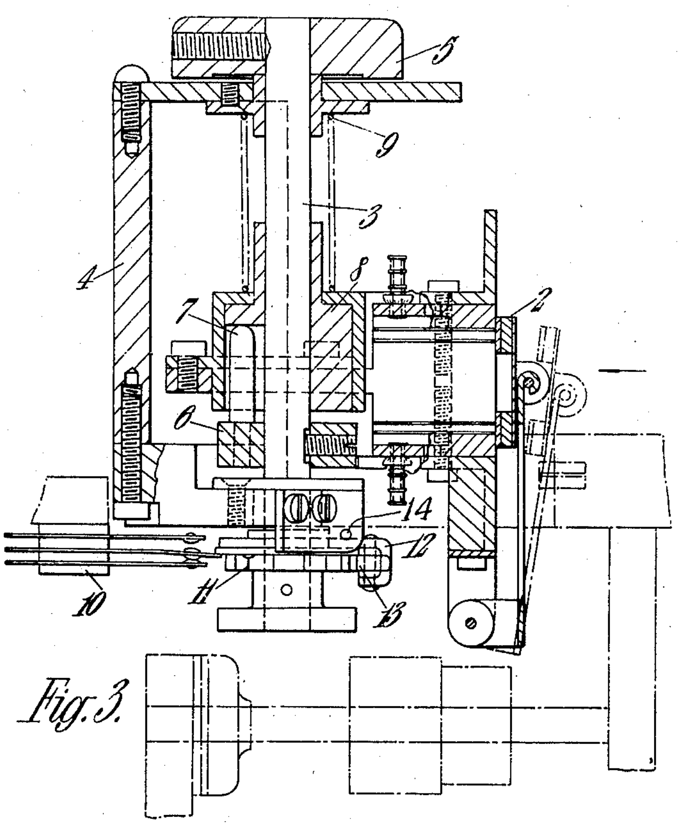
Figure 4 is a side view looking in the direction of the arrow on Figure 3.

Three heads 1*a*, 1*b*, 1*c* respectively for recording, play-back and erase are mounted side by side in a block 1 to which a hinged tape supporting member 2 is secured.

The block 1 is adapted to slide vertically on a rod 3 supported in a frame 4.

At the top a control knob 5 is provided on the rod 3 for manually turning it.

Towards the bottom end of the rod 3 is secured a disc member 6 carrying a short vertically upwardly projecting rod 7 adjacent its circumference.

The block 1 carries a circumferential or spiral cam 8 winding around the rod 3 and this is engaged by the end of the rod 7 which acts as the cam follower.

Thus, as rod 3 is rotated in one direction, the rod 7 will lift the block 1 progressively until it passes off the end of the spiral cam surface when the block 1 will drop down again under the influence of the helical spring 9 and gravity. The tape itself is, of course, kept moving in a fixed lateral path.

The rod 3 will be rotated step-by-step by means of a ratchet mechanism (not shown) operated by a solenoid which will be operated by the conducting strips mentioned to give the various heights of the block 1 corresponding to the tape track positions.

Changeover contacts 10 control the direction of operation of the tape. Notched disc 11 is secured to rotate with the rod 3. An arm 12 is pivoted on a pin 14 so that its end reciprocates in relation to the frame 4. It is mounted in a diametral position in relation to the disc 11 and is engaged with the periphery of the disc 11 by means of a rotatable roller 13 mounted on the end of the arm remote from the contacts 10.

Disc 11 has half as many recesses around its periphery as the number of tracks on the tape.

Figure 5:
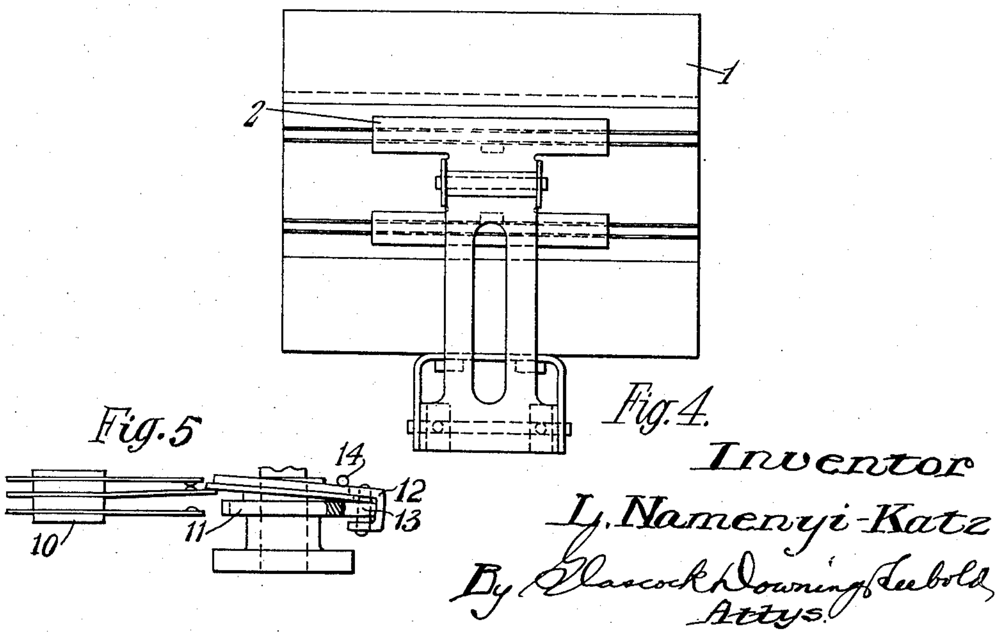
Figure 5 is a detail from Figure 3 showing the contacts in the changed-over position.

When rod 3 is turned by one step by means of the ratchet mechanism roller 13 moves into or out of a notch in the disc 11 and the resulting movement of the arm 12 either causes the arm 12 to engage the central contact member of contacts 10 to close the lower contacts as shown in Figure 3 or releases the central contact member to spring up to close the upper contacts, carrying the arm 12 with it, as shown in Figure 5. This contact changeover is arranged to reverse the direction of operation of the tape as successive tracks on the tape are brought into operation. One means for doing this is described in British Patent No. 787,405.

Various modifications may be made within the scope of the invention.

I claim:

A supporting arrangement for a recording or reproducing head for a multi-track magnetic tape recorder, comprising a rotatable shaft, carrier means for said head mounted to slide freely on said shaft, a spiral cam and a cam follower mounted on said shaft and cooperating for displacing said carrier means step by step longitudinally of the shaft and for restoring said carrier means to its original position as said shaft is rotated in one direction, contact means for reversing the direction of drive of the tape, and reciprocable spring loaded means operated by the rotation of said shaft for switching said contact means, said reciprocable spring loaded means including a notched disc fixedly carried by the shaft, a spring loaded lever mounted for reciprocal movement in relation to the shaft and in a diametral position in relation to said disc, and a roller carried by said lever and cooperating with the notched disc to reciprocate said lever as said roller is moved into and out of the notches of the disc when the shaft is rotated.

References Cited in the file of this patent

UNITED STATES PATENTS 2,468,198 Heller ---------------- Apr. 26, 1949